United States Patent
Perez Torres et al.

(10) Patent No.: US 11,639,319 B2
(45) Date of Patent: May 2, 2023

(54) PARTICLES OF FERTILIZERS ENCAPSULATED IN MODIFIED CHITOSAN AND OBTAINING METHOD

(71) Applicants: INSTITUTO DE ECOLOGIA, A.C., Xalapa (MX); CENTRO DE INVESTIGACIÓN EN QUIMICA APLICADA, Saltillo (MX)

(72) Inventors: Claudia Anahi Perez Torres, Xalapa (MX); Nicolaza Pariona Mendoza, Xalapa (MX); Carlos Jose Espinoza Gonzalez, Saltillo (MX); Jorge Romero Garcia, Saltillo (MX); Layza Alejandrina Arizmendi Galaviz, Saltillo (MX); Enrique Ibarra Laclette, Xalapa (MX); Eva Garcia Ilizaliturri, Xalapa (MX)

(73) Assignees: INSTITUTO DE ECOLOGIA, A.C., Veracruz (MX); CENTRO DE INVESTIGACIÓN EN QUIMICA APLICADA, Saltillo (MX)

(*) Notice: Subject to any disclaimer, the term of this patent is extended or adjusted under 35 U.S.C. 154(b) by 0 days.

(21) Appl. No.: 17/004,329

(22) Filed: Aug. 27, 2020

(65) Prior Publication Data
US 2022/0064077 A1 Mar. 3, 2022

(51) Int. Cl.
*C05G 5/35* (2020.01)
*A01C 21/00* (2006.01)
(Continued)

(52) U.S. Cl.
CPC .............. *C05G 5/35* (2020.02); *A01C 21/00* (2013.01); *C05G 1/00* (2013.01); *C05G 3/40* (2020.02)

(58) Field of Classification Search
CPC ... C05F 1/00; C05F 1/007; C05G 5/35; C05G 1/00; C05G 3/40; C05G 5/37; C05G 5/10;
(Continued)

(56) References Cited

U.S. PATENT DOCUMENTS

2020/0129432 A1* 4/2020 Strauss et al. ........... B01J 13/10

FOREIGN PATENT DOCUMENTS

| CN | 107793228 | 3/2018 | |
| CN | 108129190 A * | 6/2018 | ............. C05B 13/02 |

(Continued)

OTHER PUBLICATIONS

Onyango Ogutu, Fredrick, Journal of Food, Ultrasonic Modification of Selected Polysaccharides-Review (Year: 2015).*
(Continued)

*Primary Examiner* — Jennifer A Smith
(74) *Attorney, Agent, or Firm* — Defillo & Associates, Inc; Evelyn A. Defillo (57) ABSTRACT

The present invention relates to fertilizer particles encapsulated in modified chitosan and a method of obtaining them. The particles described in this invention allow a controlled, moderate, or gradual release of an active material from a reserve substrate to another medium, in order to increase the effectiveness of the active material by prolonging its action over time. This invention is characterized in that the active components of said formulations are capable of causing a synergistic effect, considerably increasing the growth and development of plants.

9 Claims, 6 Drawing Sheets

(51) Int. Cl.
 *C05G 1/00* (2006.01)
 *C05G 3/40* (2020.01)
(58) Field of Classification Search
 CPC ........... C05G 5/30; A01C 21/00; Y02A 40/20; Y02P 20/145
 See application file for complete search history.

(56) References Cited

FOREIGN PATENT DOCUMENTS

| CN | 109169663 A | * | 1/2019 | ............... C05G 5/27 |
| CN | 110734304 A | * | 1/2020 | ............. C05B 11/06 |
| CN | 111348958 A | * | 6/2020 | ............... C05G 3/00 |
| WO | WO-2017107317 A1 | * | 6/2017 | ............. B01D 67/00 |
| WO | WO-2020096908 A1 | * | 5/2020 | ............. A01N 25/26 |

OTHER PUBLICATIONS

Ha, Ngoc Minh Chau, et al. "Preparation of NPK nanofertilizer based on chitosan nanoparticles and its effect on biophysical characteristics and growth of coffee in green house." Research on Chemical Intermediates 45.1 (2019): 51-63. (Year: 2019).*

Adlim, Muhammad, et al. "Simple and Environmental Friendly Preparation and Characterization of Slow Release Urea Tablet Made of Rice Husk Ash Composite with Chitosan Coating." Pakistan Journal of Life & Social Sciences 16.1 (2018). (Year: 2018).*

Zhou Ying-heng et al: Technical and Environmental Efficiency of Hog Production in China—A stochastic frontier production function analysis; Journal of Integrative Agriculture 2015, 14(6):1069-1080.

Tilman David: Agricultural Sustainability and Intensive Production Practices; Nature, vol. 418. Aug. 8, 2022; pp. 671-677.

Khan, S; Health Risks of Heavy Metals in Contaminated Soils and Food Crops Irrigtaed With Waste Water in Beijing, China, Environmental Pollution 152 (2008); 686-692.

Wang et al.: Mitigation of Cadmium and Arsenic in Rice Grain by Applying Different Silicon Fertilizers in Contaminated Fields; Environ Sci Pollut Res; DOI 10.1007/s11356-015-5638-5; 2016.

Li, Juan; Effects of Long-Term Combined Application of Organic and Mineral Fertilizers on Microbial Biomass, Soil Enzyme Activities and Soil Fertility; Agricultural Sciences in China; 2008; 7(3); 336-343.

Wu, Lan et al.: Preparation and Properties of a Double-Coated Slow-Release NPK Compound Fertilizer with Superabsorbent and Water Retention; Bioresource Technology 99 (2008): 547-554.

Qiao, Dongling et al.: Preparation and Characterization of Slow-Reiease Fertilizer encapsulated by Starch-Based Superabsorbent Polymer; Carbohydrate Polymer 147 (2016); 146-154.

Carrillo González, R.; Nanocapsules of Urea in Chitosan and Polymethecrylic Acid and Their Application to Hydroponic Culture of Lettuce; Revista Mexicana de ingenieria Quimica; vol. 15; No. / 2 (2016); 423-431.

Cordell, Dana: The Story of Phosphorus: Global Food Security and Food for Thought: Global Enviroment Chage 19 (2009); 292-306, 16 pages.

Sempeho, Siafu: Meticulous Overview on the Controlled Release Fertilizer; Advances in Chemistry; vol. 2014, Article ID 363071 et al 2014.

Shavit, Uri; Release Characteritics of a New Controlled Release Fertilizer: Journal of Controlled Release 43 (1997); 131-138.

Kashyap, Prem Lal et al.: Chitosan Nanoparticle Based Delivey System for Sustainable Agriculture; International Journal of Biological Macromolecules (2015).

Davidson, Drew et al: Controlled Root Trargeted Delivery of fertilizer Using and Ionically Crosslinked Carboxymethyl Cellulose Hydrogel Matrix; SpringerPlus (2013), 2:318.

Corradini E.; A Preliminary Sudy of the Incorporation of NPK Fertilzer into Chitosan Nanoparticles: Express Polymer Letters vol. 4; No. 8 (2010); 509-515.

Riyajan, Sa-Ad; Green Natural Rubber-g-modified Starch for Controlling Urea Release; Carbohydrate Polymers 89, (2012); 251-258.

Navarro-Guajardo, Noe; Candelilla Wax as Natural Slow-Reiease Matrix for Fertilizers Encapsulated by Spray Chiling; et al., J. Renew Matter, vol. 6, No. 3 (2017).

Fao: Estado Mundial de la Agricultura y la Alimentacion (2013) ISSN 0251-1371.

Hussain, Rabiul; Controlled Release of urea from Chitosan Microspheres Prepared by Emulsification and Cross-Linking Method; Iranian Polymer Journal (2012) ISSN 1026-1265 vol. 21, No. 8; 473-479.

* cited by examiner

| | Figure 2a | Figure 2b | Figure 2c | Figure 2d |
|---|---|---|---|---|
| NM0 |  |  |  |  |
| NM3 |  |  |  |  |
| NM13 |  |  |  |  |

PARTICLES OF FERTILIZERS ENCAPSULATED IN MODIFIED CHITOSAN AND OBTAINING METHOD

TECHNICAL FIELD

The present invention belongs to the technical field of chemistry. Particularly in the technical field of chemistry applied to agriculture and, more particularly, it refers to the use of fertilizers encapsulated with modified chitosan to stimulate vegetable growth.

BACKGROUND

The increased input of fertilizers, water, and pesticides, together with new technologies, have generated immense developments in modern agriculture during the past century. Crop production per unit of land has greatly increased due to population growth promoting economic development (Zhou et al., 2015). While these developments have been significant, the environmental impacts are generally not investigated. The costs associated with the development of agriculture as a result of the excessive application of fertilizers and pesticides have led to eutrophication of water and toxicity, contamination of groundwater and air, degradation of soil quality, and even changes in entire ecosystems, raising questions about the sustainability of modern agriculture (Tilman, 2002; Khan, 2008; Wang et al., 2016).

To meet the demands of improving yields without compromising the environment, slow or controlled release fertilizers have been developed, which are capable of releasing nutrients gradually, in synchronization with the nutritional demand that is required during the different phases of production. crop growth. Thus, slow, or controlled release fertilizers show great potential to improve crop efficiency and to reduce environmental problems caused by the management of conventional fertilizers (Li et al; Wu & Liu, 2008 Qiao et al., 2016).

In general, slow, or controlled release fertilizers are prepared by physically encapsulating the fertilizer with inorganic or organic hydrophobic materials, which serve as a diffusion barrier (Carrillo González, et al 2016). In these systems, synthetic polymers have been used primarily due to their availability and variety. However, the use of non-biodegradable synthetic matrices leads to serious environmental problems associated with an undesirable accumulation of plastic waste, because they decompose very slowly or never in the soil (Cordell et al., 2009; Sempeho et al 2014; Shavit. 1997).

These concerns have motivated research towards the development of fertilizer encapsulates with natural biodegradable polymers/blends derived from renewable natural resources such as chitosan (Kashyap, et al. 2015), cellulose (Davidson et. Al., 2013), starch (Qiao et al., 2016), natural rubber (Riyajan, 2012) and waxes (Navarro-Guajardo et. al., 2017) among others.

The method of encapsulating fertilizer components in polymeric particles is relatively novel and especially exploring the potential of chitosan nanoparticles as the slow or controlled release of fertilizers (Corradini et al., 2010). In this sense, in recent years there has been a growing trend towards the development of controlled release systems with biodegradable polymers. These systems are preparations that modify the rate or site of release of the active agent, which allows the positive effect to be achieved with few doses. For their part, Wu et al. (2008) developed a NPK fertilizer with controlled release capacity and water retention, by using an internal chitosan coating and an external poly (acrylic acid-co-acrylamide) coating [P (AA-co-AM)], which is a super absorbent polymer. The product was found to show slow controlled release of nutrients. Chitosan is an easily biodegradable material, while P (AA-co-AM) can degrade in soil, so matrix polymers are not harmful to the environment.

In similar efforts, Corradini et al., 2010 studied the possibility of using chitosan nanoparticles for the slow release of NPK fertilizer, while Hussain et al., 2012 analyzed the controlled release of urea from chitosan microspheres. Although the preparation of nanoparticles as controlled release devices can be more expensive than simple materials, both technical and economic advantages are evident, for example, with non-encapsulated materials the release of nitrogen, phosphorus and potassium for optimal absorption by crops, undesirable losses of nutrients in the soil, water and air cannot be avoided either. While with controlled release agents there are important benefits by requiring less fertilizers, by avoiding undesirable losses of these and, even more important, by considerably reducing the undesirable environmental impact.

One of the documents of the state of the art closest to the present invention corresponds to the Chinese application CN107793228, which describes a method of preparing a controlled release fertilizer, where they use acylated chitosan with a low degree of substitution as a matrix, which is obtained by allowing caprylyl chloride to react with chitosan; then, the acylated chitosan is further modified using glutaraldehyde as a cross-linking agent, to obtain compact cross-linked modified chitosan; diatomaceous earth is modified using a titanate coupling agent; the surface of the polyvinyl alcohol is then modified using a silane coupling agent; A soft group of the silane coupling agent is allowed to generate a hydrolysis reaction with water to subsequently form an a silanol group. According to the description, this method makes it possible to improve the hydrophobicity of the matrix; the surface of the polyvinyl alcohol is further modified using the modified chitosan and the modified diatomite; the biodegradability and hydrophobicity of the matrix material are further improved.

The controlled release of agrochemicals can be an encouraging method that will solve many problems of contamination of soils and water tables. For its part, the state of the art reveals that chitosan is a valuable carrier for the controlled release of agrochemicals due to its proven biocompatibility, biodegradability, absence of toxicity and adsorption. However, the need to improve the release of the active ingredients without affecting the qualities of the same still prevails; and even more, the need to formulate delivery systems that generate effects that contribute to improving the activity of the encapsulated bioactive agent, inducing improvements in the growth and development of plants. This is because the active ingredient that is loaded into micro and nanoparticle systems can be manufactured at the time of particle preparation (incorporation) and even after particle formation (incubation). In these systems, the actives can be physically within the matrix or adsorbed on the surface. Various techniques have been developed to improve the loading efficiency of the active ingredient, but those of us involved in this technical field have identified that the efficiency depends largely on the preparation method and the physical-chemical properties of the active substance. Charging efficiency is generally maximized when the substance is incorporated during particle formation, whereas particle formation typically gives a lower degree of incorporation, that is, the degree of incorporation is also influenced by specific process parameters, such as a method of preparation, the presence of additives (for example, crosslinking agents, stabilizers, surfactants, etc.), as well as the intensity of stirring.

OBJECT OF THE INVENTION

Therefore, fertilizers are currently being generated that present a special treatment on the surface or coating with the aim that these are of controlled release. Fertilizers of this type consist mainly of encapsulating the fertilizer that allows the slow release of the active agent so that the plant can absorb, fix, and assimilate it.

Therefore, in order to direct strategies towards the development of new controlled release fertilizers, the use of modified chitosan as a matrix of controlled release of the active agent is demonstrated to achieve an availability of nutrients in synchrony with the requirements of the plants, this It allows to avoid an overdose or lack of nutrients likewise, it allows to generate an effect that helps to increase the growth and development of plants, avoid contamination or toxicity in bodies of water as a consequence of an overdose of active agents that helps to comply with environmental regulations.

The production of chitosan microspheres and nanospheres loaded with an active agent through the spray drying process, allows promoting new mechanisms of controlled release of fertilizers and effects that help to improve the activity of the encapsulated bioactive agent, inducing improvements in the growth and development of plants, as a strategy to reduce their loss in agriculture, increase yields and avoid contamination in bodies of water mainly due to leaching.

The objectives of the present invention referred to above and still others not mentioned, will be evident from the description of the invention and the figures that accompany it, with illustrative and non-limiting character, and that are presented below.

DESCRIPTION OF THE INVENTION

Slow or controlled release can be defined as the slow, moderate, or gradual transfer of an active material from a reserve substrate to another medium, in order to increase the effectiveness of the active material by prolonging its action over time. The foregoing in order to reduce the impact on those other means to which it is not directed and to simplify the dosage to avoid losses due to degradation, volatilization, and leaching.

In this sense, one of the main challenges for the future in the agricultural sector is to use fertilizers more efficiently for a better absorption of nutrients by plants (FAO, 2013). The advantages of controlled fertilization are broad such as: nutrients in an intelligent, uniform, and constant way, as well as in dose and proportion.

For the present invention, a vegetable "nutrient" should be understood as all the essential chemical elements in all stages of vegetable development. Generally, nutrients are classified into two large groups as macronutrients, which are necessary in large quantities, among which we find N, P, K, Ca, Mg, and S in addition to C, O and H, and micronutrients, which they are necessary in small quantities, among which we find Fe, Zn, Cu, B, Mo, Mn and Cl, Co, I, F, Va, Se and Br.

For the purposes of the present invention, "nutrient" should be understood as any component of these two large groups or a combination of both. Likewise, the terms or concepts "nutritive agent, nutrient, active agent, active ingredient or active principle" can be used interchangeably and with the same meaning to refer to any of said vegetable nutrients or to their mixtures.

For the present invention, "fertilizer" should be understood as a substance or mixture of substances that contains vegetable nutrients, in such a way that they allow proper vegetable nutrition in order to replace and avoid nutrient deficiencies or increase vegetable production. Slow or controlled release fertilizers can be obtained by covering an active agent with a matrix of a semipermeable material or some type of polymer with encapsulating characteristics.

For the present invention the term "additive" must be interpreted in its broadest sense, it should be understood as "additive" to a substance or mixture of substances that is incorporated into a fertilizer to improve its properties or behavior, such as an agent conditioner, an adjuvant, a binding agent or an anti-caking agent, a preservative agent, a coating agent, an agent that facilitates the application, compatibility with other products, cross-linking agents, stabilizers, surfactants and even colorants, etc.

The method for obtaining micro and nanoparticles of fertilizers comprises the following stages:

A) Modify the Physical-Chemical Properties of Chitosan.

This stage allows to obtain modified chitosan, this chitosan has a higher solubility capacity in water without affecting its viscosity; as well as the texture of the powder particles obtained from a modified chitosan solution. It should be noted that the method to modify the properties of chitosan is widely disclosed in the application MX/a/2018/011080, however, for better clarity of the subject matter of protection, the steps that it comprises are described below:

a) Prepare a chitosan solution;

Chitosan is insoluble in neutral aqueous solutions; however, in dilute solutions of organic acid 1% (v/v) the amino groups of the chitosan begin to protonate (associating with the counter-ion acetate) making the charged polymer soluble.

b) Filtering the solution obtained in step a), to remove impurities or residues;

c) Obtain a mixture by combining the chitosan solution obtained in step b) with at least one sugar-type carbohydrate, in a ratio of at least 1:0.1, preferably 1:1, respectively;

d) Perform an ultrasound treatment;

Submit the mixture obtained in step c) to an ultrasound treatment process with a frequency of 200 kHz to 10,000 kHz and with a wave amplitude of 0.1% to 100%, at an operating temperature greater than 0° C. and for a time of at least 1 min. Ultrasound irradiation in this frequency range generates two types of physicochemical processes capable of inducing changes at the molecular level. The first phenomenon is related to a vibrational movement of the bonds and functional groups of the molecules, capable of inducing chemical reactions in the medium. On the other hand, an acoustic cavitation process is generated, in which the thermal dissociation of the molecules of water and/or oxygen dissolved in the medium, or another gas, produces different types of reactive species such as OH*, H*, O* and hyperoxyl radicals (OOH*), which are capable of inducing chemical reactions in the medium.

During this stage, ultrasound irradiation at a frequency of 200 kHz to 10,000 kHz, and preferably 550 kHz to 1134 kHz, generates a grafting reaction of the sugar-type carbohydrate on the chitosan molecule. Preferably, this grafting reaction occurs between the hydroxyl functional groups of the sugar-type carbohydrate and the glycosidic bond and/or amide group of the chitosan molecule, which is given by the following formula:

However, it is possible that graft reactions through other functional groups of the chitosan molecule, such as amine and/or hydroxyls, occur to a lesser extent, maintaining the advantages described in the present invention. The grafting of the sugar-type carbohydrate onto the chitosan molecule, through these chemical sites or functional groups, can be determined by techniques such as proton nuclear magnetic resonance (RMN H+) and carbon-13 (RMN 13C).

The ultrasound frequency, wave amplitude, temperature and time are operating parameters that can affect the acoustic cavitation process, and therefore affect the physicochemical characteristics of the chitosan molecule.

High Solubility Modified Chitosan

The unmodified chitosan has a solubility of 0% at pH 7.0, while the modified chitosan obtained with the method described previously is characterized in that it has a solubility of at least 50% at pH 7.0, preferably at least 60% at pH 7.0.

B) Spray Drying to Obtain Micro and Nanoparticles of Fertilizers Encapsulated with Modified Chitosan.

At this stage, both the modified chitosan solution and the nutritive agent or active agent are mixed in equal proportions. Subsequently, the mixture is kept under stirring, at a temperature of 40° C., for 30 minutes before passing to spray drying.

In one embodiment of the present invention, 50 mL of the modified chitosan solution, which was obtained in the previous step, was mixed with 50 mL of active agent to have a 1:1 ratio.

Set up a drying equipment to work at an atomization air pressure of between 3 to 10 bars, preferably 6 bars and a temperature of up to 250° C., preferably 160° C. Feed the solution at a minimum pumping rate of 10% to have greater drying and particle formation on the micro and nanoscale. Configure the equipment to perform a 90% aspiration, in order to attract the greatest amount of dried atomized particles to the cyclone, this together with a Clean Nozzler of 3 times per minute to clean and prevent the entrance of the nozzle from being covered. As the technician in the field may anticipate, there are multiple appropriate equipment on the market to carry out this stage, consequently, any of them is appropriate to carry out the invention, making the pertinent adjustments based on the characteristics of each one of said devices

BEST METHOD TO CARRY OUT THE INVENTION

The present examples are illustrative but not limiting, since a person skilled in the art will understand that there are variants that fall within the scope of protection of the present invention.

Phosphorus (P), nitrogen (N) and potassium (K) are the main vegetable macronutrients that most limit crop production, and these have been widely used for the development of fertilizers. However, compared to the other nutrients, phosphorus is less mobile and less available to the plant in most soil conditions, which means that it is commonly one of the most limiting factors for vegetable growth. Therefore, in the present examples phosphorus was used as an active agent, obviously the person skilled in the art will be able to agree with us that any vegetable nutrient or nutrient mixtures can be used successfully in the present invention.

Example 1. Preparation of Samples

The modified chitosan mixtures were prepared according to the following:

a) Prepare a 1% (w/v) chitosan solution in an organic acid solution; In one embodiment, the solution is prepared with 1% (v/v) acetic acid, in a preferred embodiment, it is prepared by dissolving 1 g of chitosan in 100 mL of 1% (v/v) acetic acid with stirring and temperature environment for 24 hours;

b) Filter to remove impurities or residues;

c) Obtain various mixtures by combining the chitosan solution with H2O2 (30%) or with a source of sugar-type carbohydrates, or with both, as indicated in table 1. In a preferred embodiment, the sugar-type carbohydrate It is selected from among maguey honey or glucose, in different combinations and/or proportions, according to Table 1:

TABLE 1

Mixtures and proportions of each sample.

| Sample name | Mixture | Final concentration of each product in the sample (%) (v/v) | Ultrasound frequency (kHz |
|---|---|---|---|
| NM0 | Chitosan | 0.5 | |
| NM3 | Chitosan: $H_2O_2$ + Ultrasound | 0.5:1 | 858 |
| NM13 | Chitosan: maguey honey + Ultrasound | 0.5:0.125 | 858 | d) Submit 500 mL of each mixture to an ultrasound treatment process, using a sonotrode configured to work at an ultrasound frequency of 858 kHz or 1134 kHz with an ultrasound power of 60%, and a temperature of 20° C. for 30 min;

Preparation of the Modified Chitosan Micro and Nano Sphere Matrix

For the development of phosphorous-free chitosan microspheres and nanospheres, 50 mL of the control (NM0) and modified chitosan solution such as (NM3 and NM13) were mixed separately at 0.5% with 50 mL of deionized water. The solutions were allowed to stir at a temperature of 40° C. for 30 minutes before going to the spray drying method. For this, a Mini Spray Dryer spray equipment brand Buchi model B-290 was used. The process started by turning on and adjusting the equipment to a pressure of 6 bars and an inlet temperature of 160° C. and 60° C. outlet. The feeding with the solution was adjusted to a minimum pumping of 10% to have a greater drying and formation of small particles in micro and nanoscale. As for the aspiration, it was set to 90%, in order to attract the greatest amount of dried atomized particles to the cyclone, this together with a Clean Nozzler of 3 times per minute to clean and prevent the entrance of the nozzle from being covered.

Development of the matrix of micro and nanospheres of modified chitosan with high solubility with phosphorus as an active agent.

For the encapsulation of the active agent in the microspheres and nanospheres, we proceeded to mix, in a 1:1 ratio (V/V), 50 mL of monobasic potassium phosphate (0.5%) with 50 mL of each of the solutions of 0.5% NM0 control chitosan and modified chitosan such as NM3 and NM13.

As with the previously described process, the solution was allowed to stir at a temperature of 40° C. for 30 minutes before moving on to spray drying. For this, a Mini Spray Dryer spray equipment brand Buchi model B-290 was used. The equipment was adjusted to a pressure of 6 bars and an inlet temperature of 160° C. and an outlet temperature of 60° C. The feeding with the solution was adjusted to a minimum pumping of 10% to have a greater drying and formation of small particles in micro and nanoscale. As for the aspiration, it was set to 90%, in order to attract the largest amount of dried atomized particles to the cyclone, this together with a Clean Nozzler of 3 times per minute to clean and prevent the entrance of the nozzle from being covered.

Example 2. Morphological Characteristics of Particles of Encapsulated Systems of Modified Chitosan of High Solubility The characterization of the morphology of the matrices was carried out in the field emission scanning electron microscope (SEM) at a magnification of 5,000×. The characteristics of each of the micro and nanospheres of the chitosan matrices are detailed below: NM0, NM3 and NM13.

The morphology of the micro and nanoparticles of the NM0 control (FIG. 1a) shows the presence of folds or roughness on the surface, as well as the presence of cavities. This characteristic only occurs in microparticles which have a spheroid shape, while in nanospheres they tend to be more spherical with the presence of cavities. The size of the NM0 particles varies greatly among them, that is, it has high polydispersity. The lack of attraction between the chitosan spheres can also be observed since they are dispersed.

The modified matrix particles NM3 and NM13 (FIGS. 1b and 1c) show a smooth morphology on the surface of most micro and nanoparticles. It should be noted that the presence of cavities in the NM3 and NM13 modified chitosan particles is exceptionally low compared to the NM0 samples. On the other hand, it can be observed that said spheres have a certain attraction between them, forming agglomerations, as well as particles with a smooth surface and cavities. This agglomeration behavior of the NM3 sample particles appears to be greater.

Figure 1A:
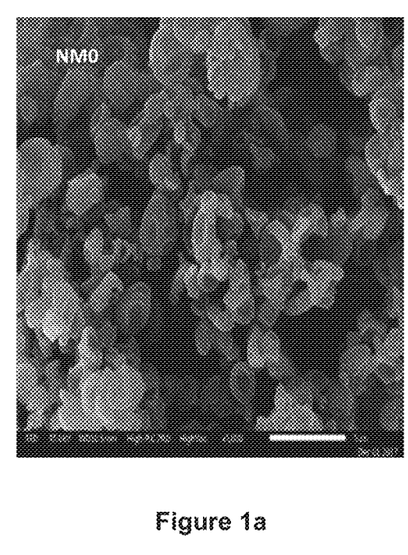
FIGS. 1a-1c show morphological characteristics of fertilizer micro and nanoparticles encapsulated with conventional chitosan (NM0), and modified chitosan (NM3 and M13) by means of ultrasonic treatment.
Figure 1B:
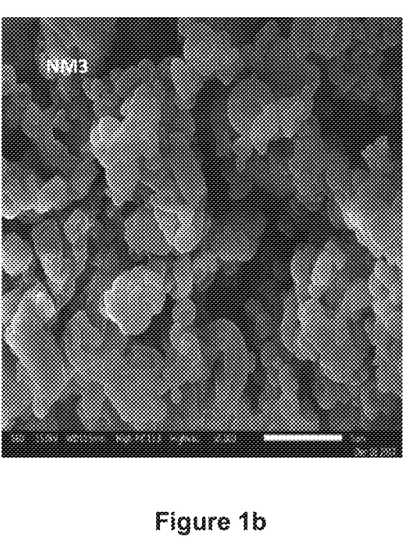
Figure 1C:
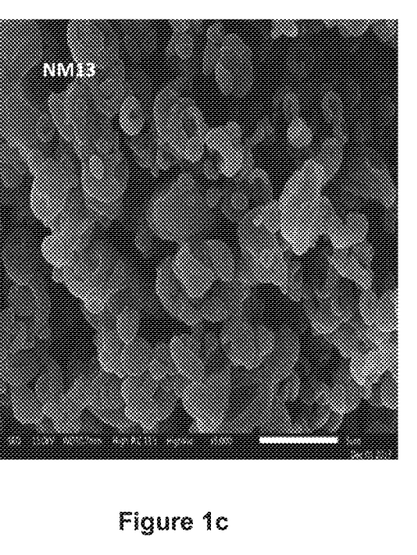
Figure 2A:
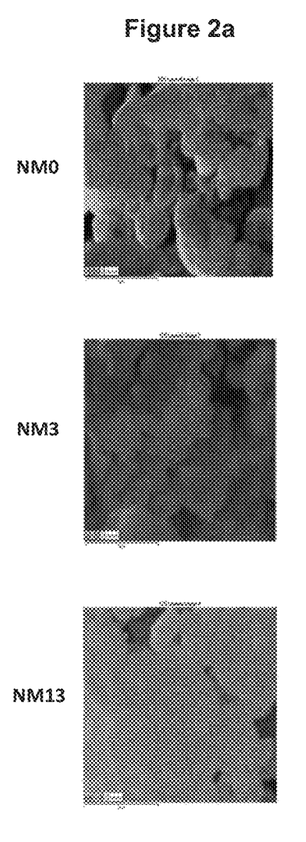
FIGS. 2a-2d. show a scanning electron microscopy showing the internal morphology of the micro and nanoparticles of fertilizer encapsulated with modified chitosan (NM3 and NM13) and their control (NM0), and mapping of the elements phosphorous oxygen and carbon.
Figure 2B:
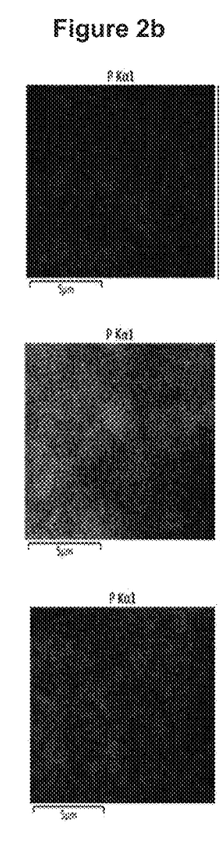
Figure 2C:
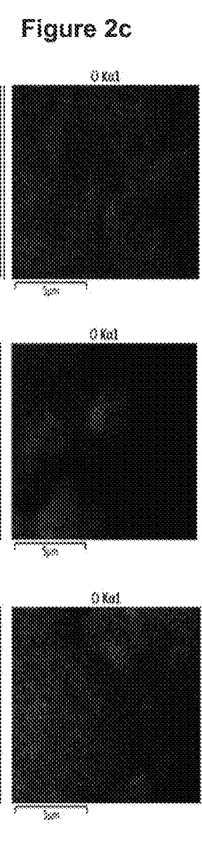
Figure 2D:
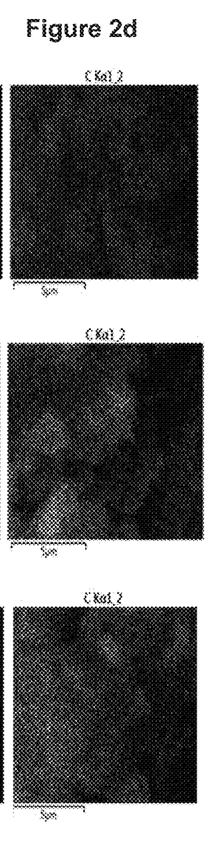

There are morphological similarities between the particles of the NM0, NM3 and NM13 matrices. However, none of these matrices presents an exactly the same morphology when compared to each other, since each one of them shows specific physical characteristics. This is possibly due to the modifications to which the chitosan solutions were previously subjected, before carrying out the spray drying process.

As will be demonstrated in the model plant growth examples, all of these modified chitosan matrices showed excellent results on inducing the growth and development of *Arabidopsis* plants.

Example 3. Release Profile of High Solubility Modified Chitosan Encapsulated Systems The efficiency of the modified chitosan samples as encapsulant for controlled release fertilizers was determined by studying the release profile of the active agent. In this case, 500 ppm of phosphorus was used as a reference value, which we represent as the 100% release value. The phosphorus release profiles were carried out under conditions that simulate the pH of the most common and abundant agricultural soils, for each of the modified chitosan samples. That is, the $KH_2PO_4$ release profile was obtained from each sample of modified chitosan encapsulates. The study was carried out in an aqueous medium and an MS medium, taking a reading of the electrical conductivity over time; 1, 15, 30, 45, 60, 90, 120, 240, 360 and 480 min. The percentages of the nutrient released from each modified chitosan sample were calculated and plotted as a function of time.

Monobasic Potassium Phosphate Calibration Curve.

Figure 3:
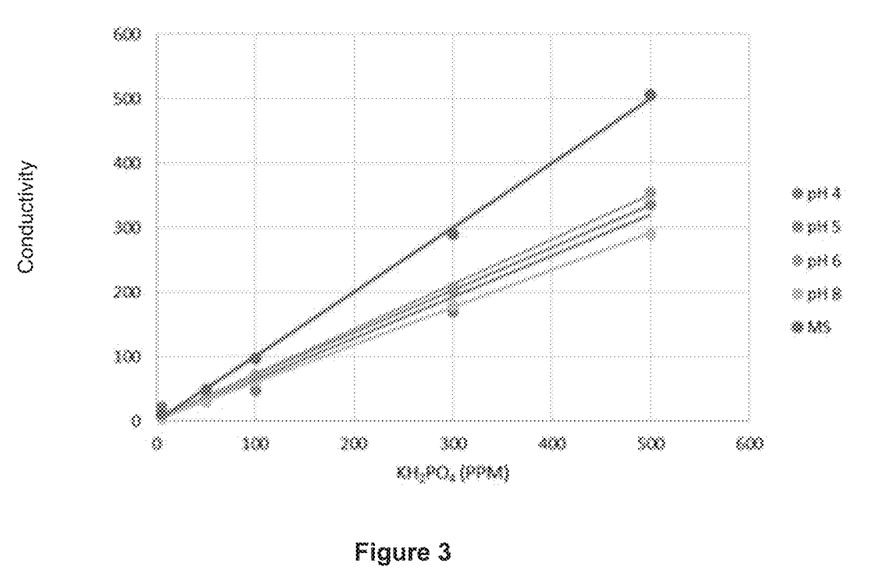
FIG. 3. shows a calibration curves used to determine the release profiles of micro and nanoparticles in aqueous medium.

A calibration curve was generated with the monobasic potassium phosphate ($KH_2PO_4$) standards; Sigma-Aldrich®), at different concentrations (5, 50, 100, 300, and 500 ppm). Subsequently, the electrical conductivity of each of the solutions was measured obtaining data in units of milliSiemens (mS), and the respective calculations were made according to the calibration curve to convert this reading into units of mg/L or parts per million (FIG. 3), obtaining a correlation index and the respective linear function of each curve, as shown in the following table:

TABLE 2

Correlation indices and equation of the linear function of each curve.

| Curve | R2 | Equation |
|---|---|---|
| pH 4 | 0.9794 | Y = 0.6391X + 0.1829 |
| pH 5 | 0.9999 | Y = 0.6590X + 4.9397 |
| pH 6 | 0.9995 | Y = 0.6947X + 3.5159 |
| pH 8 | 0.9996 | Y = 0.5819X + 1.9590 |
| Medio MS | 0.9999 | Y = 0.5295X + 1.0594 |

Figure 4A:
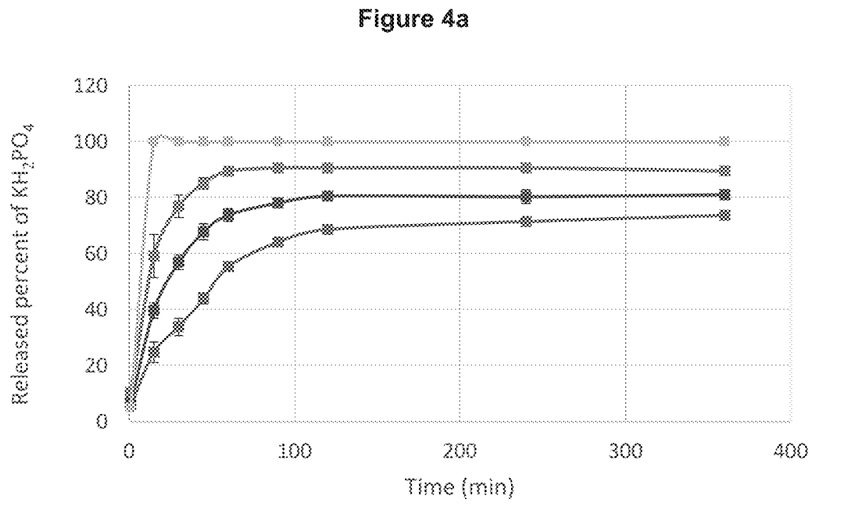
FIGS. 4a-4b show release profiles of high solubility modified chitosan encapsulated systems. A) H20 and B) Medium MS.
Figure 4B:
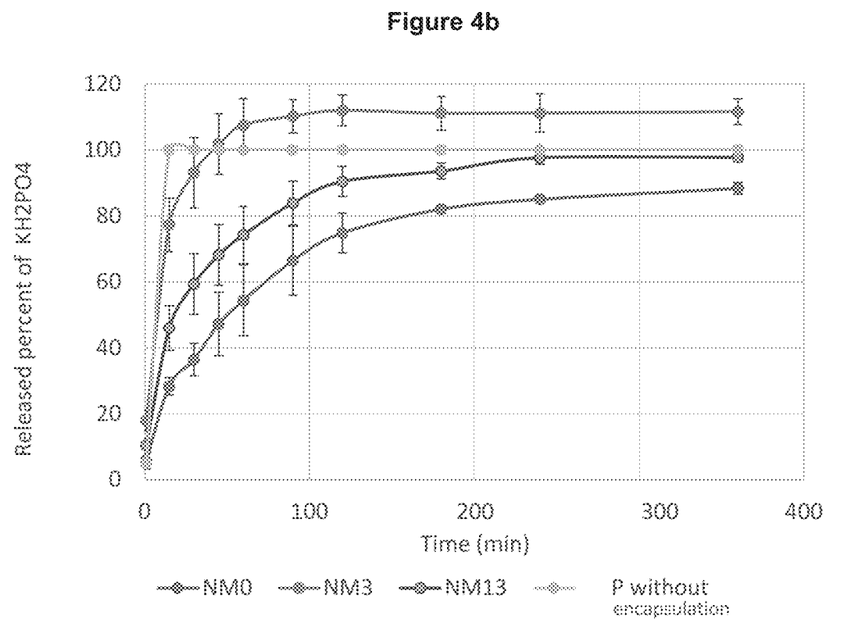

The release profile of the encapsulated systems of modified chitosan in aqueous medium was carried out as follows:

80 mg each of the nano encapsulates were placed in a semi-permeable dialysis bag (Spectra/Pore®), with a pore size of 15 kD, and, in turn, this was introduced into a bottle containing deionized water (FIG. 4a) and in a bottle containing MS medium (FIG. 4b), keeping them at a constant temperature of 25° C. and carrying out conductivity measurements at 1, 15, 30, 45, 60, 90, 120, 240, 360 and 480 min (FIG. 4). The phosphate concentrations obtained were estimated by comparing the conductivity obtained with its respective standard curve, in all of them a correlation index above 0.97% was obtained (Table 2).

FIG. 4 shows the release profile of the KH2PO4 encapsulated in the chitosan micro and nanoparticles of samples NM0, NM3 and NM13. FIG. 4a shows the profile when using an aqueous medium (deionized water), while FIG. 4b shows the profile when using MS medium.

As can be seen, according to the release profile, in FIG. 4a the control shows an extremely rapid release, reaching a 100% release during the first 10 min. While in the samples NM0, NM3 and NM13, they show a slower and gradual release, in such a way that they approach 100% during the first 90 min of the experiment. After 90 min, a constant release of the active of approximately 70%, 80% and 90%, respectively, is observed. On the other hand, the release of the active in MS medium (4b) presents an even slower release rate, compared to the release when using only H2O (4b), it takes a little more than 200 min to reach the phase of constant release, obtaining values of approximately 90%, 100% and 110% respectively.

Example 4. Effect of Micro and Nanoparticles of Fertilizers on the Growth and Development Pattern in *Arabidopsis* Plants The present study consisted of evaluating the effect of phosphorous micro and nanoparticles on the growth and development of *Arabidopsis thaliana* plants. The fertilizer micro and nanoparticles evaluated NM0, NM3 and NM13 were previously developed and characterized by observing contrasting characteristics in each one of them, so in order to verify the efficiency of these formulations, *Arabidopsis* plants were grown for 15 days under conditions optimal (MS medium added with conventional reagent grade KH2PO4 fertilizer at 136 ppm) and phosphorus limiting (without phosphorus), and adding an optimal concentration (136 ppm) of each of these formulations.

In Vitro Culture.

For this experiment, first, the *A. thaliana* seeds were sterilized with ethyl alcohol (100%) for 5 minutes, this was eliminated and later sodium hypochlorite (20%) was added for 7 minutes, which was finally eliminated. carry out at least 3 washes with sterile distilled water.

The seeds were germinated under aseptic conditions in Petri dishes with modified MS medium (Murashige and Skoog) (pH 5.7, sucrose at 0.5% [w/v] and solidified with agar at 1% [w/v]) using as limiting conditions phosphate (0 ppm KH2PO4) and optimal phosphate conditions (136 ppm KH2PO4).

The encapsulates were hydrated in sterile distilled water and subjected to a sonic bath for five minutes, to promote the dispersion of the powder, later they were incorporated into the MS culture medium (liquid) after sterilization and before being poured into the box. of Petri. To promote and standardize germination, the boxes were incubated at 4° C. for 48 h in the dark. Subsequently, the boxes were transferred to growth chambers in a controlled environment, with a photoperiod of 16 h light-8 h dark and temperature 22° C.

The *Arabidopsis* root system was analyzed through a Leica EZ4 stereomicroscope, the changes in the main root length (LRP) and the number of lateral roots (RL) were evaluated, quantifying the number of RL and measuring the LRP with a ruler.

Figure 5A:
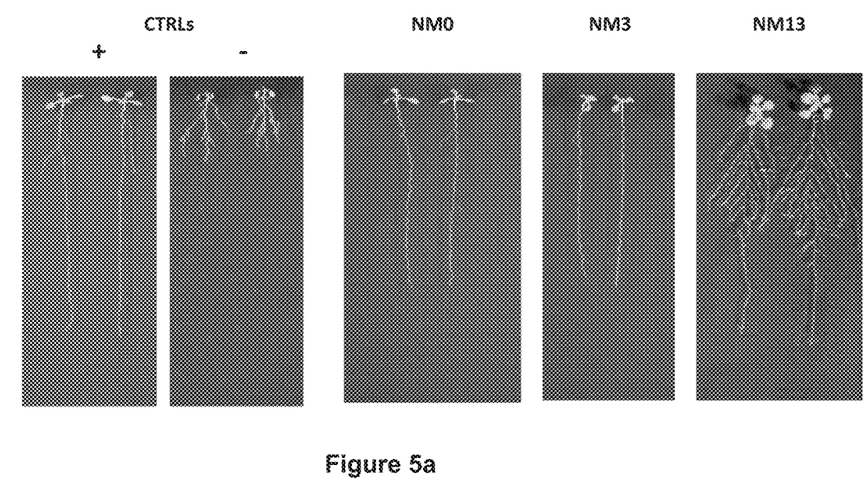
FIGS. 5a-5c show effect of encapsulated fertilizer systems (NM0, NM3 and NM13) on the growth and development of *Arabidopsis thaliana* plants.

As we can see in FIG. 5, in vitro growth allowed us to evaluate changes in root architecture, having as a positive control the growth medium with an optimal phosphate concentration (FIG. 5a, control +) and the characteristic effects of deficiency of phosphorus, which imply a decrease in the growth of the main root (length) and an increase in the formation of lateral roots (FIG. 5a, control –).

When analyzing the results obtained from the different treatments, we observed that all the fertilizer formulations (NM0, 3 and 13) presented different tendencies in terms of promoting growth and reversing the phenotype of phosphorus deficiency conditions.

Figure 5B:
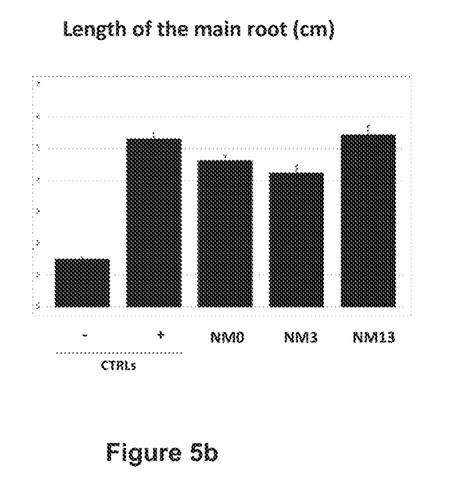
Figure 5C:
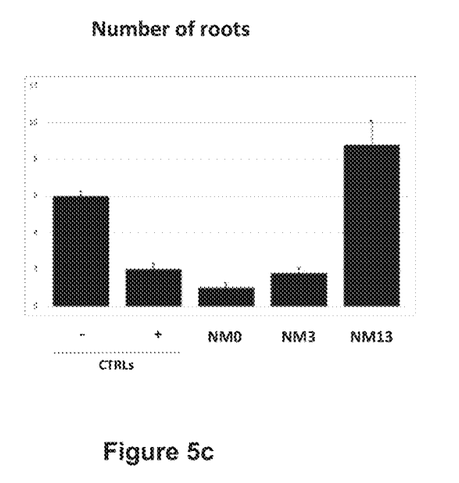

Importantly, the fertilizer micro and nanoparticles NM0, NM3 and NM13 showed that at the concentration of 136 ppm, the plants presented a phenotype very similar to that presented with the plant grown with the optimal concentration of phosphate (control +, 136 ppm KH2PO4). That is, the main root presented practically the same length or size as that of the positive phosphorus control and the number of lateral roots decreased (FIGS. 5a and b).

Figure 6:
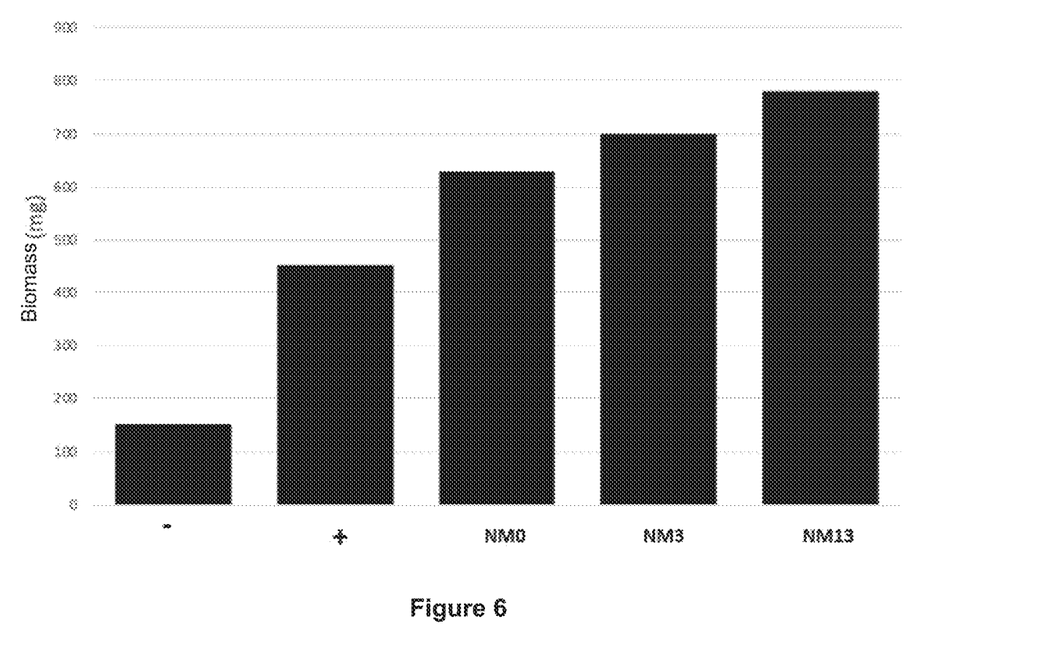
FIG. 6 shows effect of encapsulated fertilizer systems on the biomass of *Arabidopsis thaliana* plants.

The quantification of each of the analyzed parameters (FIGS. 5b and 5c) allowed us to verify the results that we visually observe in FIG. 5a. It is important to emphasize that, surprisingly, the NM13 encapsulation induced a greater effect on the growth of the root system of *A. thaliana* (FIG. 5a), since it not only increased the growth of the main root (FIGS. 5a and 5c), but also The same as the control +, but also induced a greater formation of lateral roots (FIGS. 5a and 5c) and, consequently, also caused greater foliar development. Additionally, when quantifying the biomass (FIG. 6) it is clearly observed that all the tested treatments induce a gain in biomass vs. the control +, and the highest gain (>70%) is obtained with the NM13 formulation.

By way of synthesis, we can affirm that fertilizer micro and nanoparticles exert a positive effect on the architecture of the root system by inducing a change in LRP and LR. The results conclusively show that the NM13 formulation showed the best potential by inducing the growth of both the main root, increasing the number and size of the lateral roots, as well as the shoot (FIG. 5). This was observed both in the tests that were carried out to study the alterations in the architecture of the root system (FIG. 5), and when quantifying the total biomass in these treatments, comparing them with the P+control at the same concentration (136 ppm).

The findings of this project demonstrated that plants 15 days after germination (ddg) are capable of inducing root and shoot growth thanks to the effect of fertilizer micro and nanoparticles, with NM13 being the formulation that showed a greater potential. These alterations were caused both by the concentration of phosphorus they contain and which they are capable of releasing, and by the matrix used for encapsulation, observing a synergistic effect between both components in said formulation.

In addition to these tests, tests were carried out to determine the release profiles of these formulations (FIG. 4), obtaining as a result a Peppas-Reinhart-type release model in which the nutrient release rate depends on the humidity of the medium in the that diffuses and the ability of the polymeric matrix to absorb said moisture, which is why the formulations can be considered as potential slow-release fertilizers.

Without intending to limit the scope of the present invention or limit ourselves to any particular mechanism, we believe that the "improved growth" that *Arabidopsis thaliana* presented under these experimental conditions could be attributed to the concurrence of various factors such as the modifications that are applied to it. made chitosan, micro and nanoparticles and the active agent that in short are generating a synergy in vegetable growth, and differentially in the root system, with the consequent large increase in biomass of the shoot.

Notwithstanding that the foregoing description was made taking into account the preferred embodiments of the invention, it should be noted by those skilled in the art that any modification of form and detail will be within the spirit and scope of the present invention. The terms in which this report has been written must always be taken in a broad and non-limiting sense. The materials, shape, and description of the elements will be susceptible to variation as long as this does not imply an alteration of the essential characteristic of the model.

BIBLIOGRAPHY

Kashyap, Prem & Xiang, Xu & Heiden, Patricia. (2015). Chitosan nanoparticle based delivery systems for sustainable agriculture. International Journal of Biological Macromolecules. 77. 36-51. 10.1016/j.ijbiomac.2015.02.039.

L. Wu, M. Liu, R. Liang, Bioresour. Technol. 99 (2008) 547-554

E. Corradini, M. R. de Moura, L. H. C. Mattoso, Express Polym. Lett. 4 (2010) 509-515

M. R. Hussain, R. Devi, T. K. Maji, Iran Polym. J. 21 (2012) 473-479

The invention claimed is:

1. A method to obtain particles of fertilizers encapsulated in modified chitosan, the method comprising the following steps:
    i) modifying physical-chemical properties of chitosan by;
        a) preparing a solution consisting of chitosan and an organic acid solution at 1% (v/v);
        b) adding at least one sugar-type carbohydrate;
        c) performing a high frequency ultrasound treatment to obtain a modified chitosan solution;
        d) mixing the modified chitosan solution with deionized water; and
    ii) encapsulating a nutritive agent or an active agent in the modified chitosan to form a micro or nano sphere matrix by:
        e) mixing in equal proportions the modified chitosan mixed with deionized water and the nutritive agent or the active agent, keeping stirring at a temperature of 40° C., for about 30 minutes;
        f) spray drying the mixture from the previous step at air pressure of between 3 to 6 bars and a temperature of up to 250° C. to obtain the fertilizer encapsulated in modified chitosan.

2. The method to modify chitosan according to claim 1, wherein the organic acid solution is acetic acid at 1% (v/v).

3. The method for modifying chitosan according to claim 1, wherein the sugar-type carbohydrate is in a ratio of 0.1:1 to 1:1 with the chitosan.

4. The method for modifying chitosan according to claim 3, wherein the sugar-type carbohydrate is selected from among maguey honey or glucose.

5. The method for modifying chitosan according to claim 1, wherein the high-frequency ultrasound treatment is carried out with a frequency between 200 kHz to 10,000 kHz.

6. The method for modifying chitosan according to claim 5, wherein the high-frequency ultrasound treatment is carried out with a frequency between 550 KHz and 1134 KHz.

7. The method for modifying chitosan according to claim 5, wherein the high-frequency ultrasound treatment is carried out with a frequency between 858 KHz to 1134 KHz.

8. The method for modifying chitosan according to claim 1, wherein the treatment with high frequency ultrasound is carried out for 30 minutes and at a temperature of about 20° C.

9. The method for modifying chitosan according to claim 1, wherein the drying equipment is configured to work at an atomization air pressure of 6 bars and a temperature of 160° C.

* * * * *